US009783754B2

(12) United States Patent
Mattiola et al.

(10) Patent No.: US 9,783,754 B2
(45) Date of Patent: Oct. 10, 2017

(54) METHODS FOR MANAGING A PRODUCT CARRIER

(75) Inventors: Paul Anthony Mattiola, Coopersburg, PA (US); Vladimir Yliy Gershtein, Allentown, PA (US); Karen Marie Campbell, Coopersburg, PA (US)

(73) Assignee: Air Products and Chemical, Inc., Allentown, PA (US)

( * ) Notice: Subject to any disclaimer, the term of this patent is extended or adjusted under 35 U.S.C. 154(b) by 1601 days.

(21) Appl. No.: 11/437,110

(22) Filed: May 18, 2006

(65) Prior Publication Data

US 2006/0259319 A1 Nov. 16, 2006

Related U.S. Application Data

(60) Provisional application No. 60/682,992, filed on May 20, 2005.

(51) Int. Cl.
*C10L 3/00* (2006.01)
*G06Q 30/02* (2012.01)
(Continued)

(52) U.S. Cl.
CPC .......... *C10L 3/00* (2013.01); *G06Q 30/0283* (2013.01); *G07F 7/0609* (2013.01); *G07F 15/001* (2013.01); *H01M 8/04089* (2013.01)

(58) Field of Classification Search
CPC .... H01M 8/04208; Y02E 60/50; Y02E 60/52; G06Q 30/0283; C10L 3/00; G07F 15/001
(Continued)

(56) References Cited

U.S. PATENT DOCUMENTS 4,834,049 A * 5/1989 Cadenhead, Sr. ............. 122/438
4,846,233 A 7/1989 Fockens
(Continued)

FOREIGN PATENT DOCUMENTS

JP 05-085596 A 4/1993
JP 2001068138 * 3/2001 .............. H01M 8/06
(Continued)

OTHER PUBLICATIONS

US translation of JP 2001068138, pp. 1-45.*
(Continued)

*Primary Examiner* — Igor Borissov
(74) *Attorney, Agent, or Firm* — Larry S. Zelson (57) ABSTRACT

Methods are provide for dispensing a product to a user, the product releasably incorporated within a carrier. In one embodiment, the method comprises the step of providing a first user comprising at least one storage vessel for receiving and storing fresh and at least one vessel for receiving and storing spent. The method further includes the steps of: collecting spent from a storage vessel of the first user; detecting a chemical or physical property of the collected spent; and comparing the detected chemical or physical property of the collected spent with a predetermined criteria. In a second embodiment, the method comprises the step of providing the first user, and further includes the steps of: determining an estimated amount of product to be transferred to the first user; optionally, collecting and validating information concerning the purchaser; transferring fresh to the storage vessel of the first user; collecting measurement data concerning fresh transferred from the first user; removing spent from a storage vessel of the first user; collecting measurement data concerning spent collected from the first user; optionally, calculating the net amount of product transferred; and determining whether the transfer of fresh (Continued)

and removal of spent has been performed on a substantially equal exchange basis. In a third embodiment, the method comprises providing a first user and a seller, the seller transferring fresh to the first user, collecting measurement data, and assigning a monetary price to be charged to the user.

23 Claims, 3 Drawing Sheets

(51) Int. Cl.
  *G07F 7/06* (2006.01)
  *G07F 15/00* (2006.01)
  *H01M 8/04089* (2016.01)

(58) Field of Classification Search
  USPC ......... 141/231–233, 83, 110, 18, 2, 4–7, 94,
   141/100, 21, 22, 51; 62/46.1, 46.2, 46.3,
   62/49.1, 45.1; 705/413, 1, 1.1, 7, 28, 29,
   705/30, 400; 429/515; 137/113;
   370/395.51, 395.52
  See application file for complete search history.

(56) References Cited

U.S. PATENT DOCUMENTS

| | | | |
|---|---|---|---|
| 5,360,467 A * | 11/1994 | Ketkar et al. | 95/25 |
| 5,579,233 A * | 11/1996 | Burns | 700/240 |
| 6,382,264 B1 * | 5/2002 | Tsai et al. | 141/1 |
| 6,802,875 B1 * | 10/2004 | Kimbara et al. | 48/61 |
| 7,169,489 B2 * | 1/2007 | Redmond | 429/12 |
| 7,550,113 B2 * | 6/2009 | Speranza et al. | 422/62 |
| 2004/0081867 A1 * | 4/2004 | Edlund | 429/22 |
| 2004/0223907 A1 | 11/2004 | Pez et al. | |
| 2005/0002857 A1 | 1/2005 | Pez et al. | |
| 2006/0118201 A1 * | 6/2006 | Li et al. | 141/231 |
| 2007/0068596 A1 * | 3/2007 | Corless et al. | 141/94 |

FOREIGN PATENT DOCUMENTS

| | | | | |
|---|---|---|---|---|
| JP | 2001-159498 A | | 6/2001 | |
| JP | 2004-136942 A | | 5/2004 | |
| WO | WO0199222 | * | 12/2001 | H01M 8/00 |

OTHER PUBLICATIONS

U.S. Appl. No. 10/833,467, filed Apr. 27, 2004, Larry Bagzis et al.
U.S. Appl. No. 10/948,277, filed Sep. 23, 2004, Daniel Tempel et al.
U.S. Appl. No. 11/208,723, filed Aug. 23, 2005, Daniel Tempel et al.
U.S. Appl. No. 11/398,961, filed Apr. 6, 2006, Vladimir Gershtein et al.
U.S. Appl. No. 11/398,965, filed Apr. 6, 2006, Vladimir Gershtein et al.
U.S. Appl. No. 11/398,960, filed Apr. 6, 2006, Vladimir Gershtein et al.

* cited by examiner

METHODS FOR MANAGING A PRODUCT CARRIER

CROSS-REFERENCE TO RELATED APPLICATIONS

This application claims priority to U.S. Provisional Application Ser. No. 60/682,992 filed May 20, 2005.

The subject matter of the instant invention is related to the following commonly assigned Patents and Patent Applications: Ser. No. 10/430,246, filed May 6, 2003 and entitled "Hydrogen Storage by Reversible Hydrogenation of Pi-Conjugated Substrates" (now Publication No. US2004-0223907-A1); Ser. No. 10/833,467, filed Apr. 27, 2004 and entitled "Method of Delivering a Reversible Hydrogen Storage Fuel to a Mobile or Stationary Fuel Source"; Ser. No. 10/833,484, filed Apr. 27, 2004 and entitled "Hydrogen Storage By Reversible Hydrogenation Of Pi-Conjugated Substrates"; Ser. No. 11/398,961, filed Apr. 6, 2006 and entitled "Method and System of Supply and Delivery of Product Contained in a Carrier"; Ser. No. 11/398,965, filed Apr. 6, 2006 and entitled "Secure Loop System and Method for Supply and Delivery of Product Contained in a Carrier"; and Ser. No. 11/398,960, filed Apr. 6, 2006 and entitled "Efficient System and Method for Delivery of Product and Return of Carrier. The disclosure of these patents and patent applications is hereby incorporated by reference.

FIELD OF THE INVENTION

The instant invention relates to a method for delivering, distributing, selling and exchanging product, carrier, fresh and spent. The carrier releasably incorporates at least one product. In one example, the invention relates to a method for providing hydrogen incorporated within a liquid carrier (i.e., fresh as defined herein), and recovering spent (i.e., comprising at least one dehydrogenated carrier) for rehabilitation as a step in the transaction of delivering the hydrogen as the product.

BACKGROUND OF THE INVENTION

By way of background example, hydrogen-based fuel cells are viewed as a replacement for conventional means of generating electricity, and hydrogen is also viewed as potential fuel substitution for conventional internal combustion engines (ICE). While such hydrogen-based systems are desirable, hydrogen supply, delivery, and storage may provide a number of technical challenges. For example, a typical hydrogen delivery truck carries hydrogen at low cryogenic temperature. In an alternative method, fuel such as hydrogen can be stored as a compressed gas. Compressed gas supply may be limited, for example, by storage capacity. Another alternative comprises sorbents, for example, metal hydride sorbents, which may not be sufficient for particular products, and additionally present challenges such as weight constraints.

There is a need in this art for methods of providing product for fuel cells or ICE usage in a safe, efficient and cost-effective manner. There is also a need in this art for methods that provide a simple, efficient, and low-cost transaction that can be implemented by all product customer groups, including but not limited to vehicle operators, power generators, filling stations, carrier owners, product owners, product generators, product users, fresh/spent and product distribution sites, and other users.

BRIEF SUMMARY OF THE INVENTION

In one embodiment, the invention provides a method for dispensing a chemical product to a user, the product being releasably incorporated within a carrier. In one embodiment, the method comprises the steps of providing a first user, the first user comprising at least one storage vessel adapted for receiving and storing fresh, and at least one vessel adapted for receiving and storing spent. The method further includes the steps of: collecting spent from at least one storage vessel of the first user; detecting at least one chemical or physical property of the collected spent; and comparing the at least one detected chemical or physical property of the collected spent with at least one predetermined criteria. In a second embodiment, the method comprises the steps of providing the first user, and further includes the steps of: determining an estimated amount of product to be transferred to the first user; optionally, collecting and validating information concerning the purchaser; transferring fresh to the at least one storage vessel of the first user; collecting measurement data concerning fresh transferred from the first user; removing spent from the at least one storage vessel of the first user; collecting measurement data concerning spent collected from the first user; optionally, calculating the net amount of product transferred; and determining whether the transfer of fresh and removal of spent has been performed on a substantially equal exchange basis. In a third embodiment, the method comprises providing a first user and a seller, the seller transferring fresh to the first user, collecting measurement data, and assigning a monetary price to be charged to the user.

In another embodiment, the method comprises the steps of: providing a first user, the first user comprising at least one storage vessel adapted for receiving and storing fresh from a fresh dispensing apparatus, and adapted for receiving and storing spent generated by the first user, the at least one storage vessel comprising means for separating fresh from spent. The first user further comprises a system for separating product from fresh to form at least one product and spent. The method further includes the steps of: dispensing fresh to the at least one storage vessel; collecting spent from the at least one storage vessel; detecting at least one chemical or physical property of the collected spent; and comparing the at least one detected chemical or physical property of the collected spent with at least one predetermined criteria In yet another embodiment, the invention provides a method for dispensing a chemical product to a user, the product being releasably incorporated within a carrier. The method comprises the steps of: providing a first user, the first user comprising at least one storage vessel adapted for receiving and storing fresh from a fresh dispensing apparatus, and adapted for receiving and storing spent generated by the first user, the at least one storage vessel comprising means for separating fresh from spent. The first user further comprises a system for separating product from fresh to form at least one product and spent. The method further includes the steps of: determining an estimated amount of product to be transferred to the first user; optionally, collecting and validating information concerning the purchaser; transferring fresh to the at least one storage vessel of the first user; collecting measurement data concerning fresh transferred from the first user; removing spent from the at least one storage vessel of the first user; collecting measurement data concerning spent collected from the first user; optionally, calculating the net amount of product transferred; and determining whether the transfer of fresh and removal of spent has been performed on a substantially equal exchange basis.

The instant invention solves or avoids problems that may arise when conventional methods are used for supplying chemical product. The invention provides a carrier that contains at least one chemical as a product, as well as methods and systems for delivering, distributing, transferring, separating, collecting, detecting, accounting, billing, costing, selling, and/or buying the carrier and/or its contained product. The inventive method and systems also comprise distributing carrier between various carrier and product operational and distribution locations, as well as to the user locations. As further described herein, the carrier can comprise a composition manufactured so as to incorporate or include product, or a previously manufactured composition that is processed to incorporate product. Product can be released from the carrier by using any suitable means or method, thereby generating spent, as defined herein. The systems and methods further provide for collecting spent. The collected spent can be rehabilitated to provide a carrier that can be regenerated to provide fresh.

The instant systems and methods can be employed for delivering a carrier material with included or incorporated product (fresh, as defined herein). For example, hydrogen is a product that can be incorporated into a carrier and later released in a manner suitable for consumption such as, for example, in a fuel cell or an ICE. In this example, fresh has the ability to be processed so that it can release hydrogen, thereby becoming spent. Spent then may be regenerated back into fresh by rehabilitation to incorporate or contain hydrogen (e.g., hydrogen is removed from fresh to form spent, and hydrogen is added to rehabilitate spent for reuse as fresh). A list of exemplary carriers capable of reversibly carrying, for example, hydrogen may be found in US patent applications US2004/0223907 and US2005/0002857 (hereby incorporated by reference), and may include but not limited to the following: perhydroindolo[3,2,1-jk]carbazole, perhydrodibenzofuran, dodecahydrobiphenylene, perhydro-N,N'-diethyl-bis-indolymethane, perhydro-N-ethylcarbazole, perhydro-N-methylcarbazole, and 10-methyl-10H-phenoxazine. The instant invention delivers and/or dispenses fresh while collecting spent. The presence of a carrier in both streams of delivered fresh and returned spent is addressed by the instant invention.

The inventive method and systems comprises exchanging at least a portion of fresh for at least a portion of spent on a substantially equal basis, as defined herein. The inventive method and systems also comprise distributing carrier between the various carrier operational and distribution locations as well as to the user locations (e.g., from the carrier manufacturer and/or rehabiliation to a distribution station or to a filling station interface).

The instant invention further comprises delivery, distribution, and associated transactional methods that avoid the following problems:

Fraud or theft, for example, spent missing from vessel or package, or spent substituted with another substance.

Contamination of the spent, carrier, or fresh such as something undesirable added or formed during removal of product that may be potentially damaging by itself, damaging when regenerated, or damaging when put back into service after rehabilitation of spent.

Product manufacturing facility security when a spent, fresh, or carrier load may be returned with detrimental and potentially dangerous contaminants which may lead to a complete or partial disruption of production operations.

Inappropriate use or disposal of the carrier.

Purchasing and selling of fresh or spent based on their price differential for financial gain causing imbalances in distribution and regeneration.

The following defined terms are used herein:

"Carrier" comprises a substance or mixture of substances that is able to incorporate a product or product elements, and to release the product, thereby becoming fresh and spent reversibly. There may be different carriers for the same product, one carrier for multiple products, or different carriers for different products. By way of non-limiting examples, carrier may comprise one or more of organic compounds (e.g., ionic liquids, solvated compounds, among others).

"Fresh"—the carrier when it incorporates product or product elements.

"Spent"—the carrier when depleted or partially depleted of product or product elements. Spent may exhibit some similar chemical and/or physical properties as fresh and/or the carrier. However, spent will have at least one detectable chemical and/or physical difference when compared to fresh, such as, but not limited to, different phases, specific gravity, viscosity, density, vapor pressure, ignition point, miscibility, mass, and other known chemical and/or physical properties.

"Product" comprises any chemical that is capable of being releasably stored in a carrier. By way of non-limiting example, product may comprise hydrogen, fluorine, chlorine, oxygen, arsine, stibine, phosgene, methane, hydrogen fluoride, gases containing boron, phosphorus, aluminum, or silicon components, and combinations thereof. By way of further example, product may be incorporated into a carrier fully intact (such as $H_2$), and/or as elements of a product (such as H bound to another non-H molecule), so long as the elements can be reassembled to form product after release from a carrier.

"Purchaser" or "Purchasers" comprises an entity that purchases fresh for use or redistribution and returns spent. For example, a vehicle operator, a filling station proprietor, among others. The Purchaser may be the same entity as the Seller. In some cases the Purchaser may receive or provide only fresh or spent.

"Seller" or "Sellers" comprises an entity that distributes or sells fresh and/or product. Spent may be received in a transaction. For example, a filling distributor, a filling station proprietor, among others.

"Substantially equal basis" means that a defined amount of spent corresponds generally to a defined amount of fresh that is dispensed (e.g., into a reservoir of a user). This can be determined by a specific process variable that is associated with fresh and spent, for example, the carrying capacity of product, the mass, the density, the specific volume, or other known chemical or physical properties. Amounts of spent and fresh exchanged may not be identical due to various reasons such as, for example, product withdrawal from fresh and possibly variations in delivery equipment in use, measurement devices, computer control systems or other losses associated with removing product from fresh, among other causes for variation.

"Rehabilitation" comprises restoring spent into fresh. Rehabilitation may include product manufacture, carrier manufacture, regeneration, recycling, purification, analysis and testing, and other similar processes.

"Transaction" comprises a sales or an accounting method that takes place when an exchange of fresh and spent is made between individuals, companies, organizations within companies, purchasers and sellers, among other exchanges. The transaction may comprise the sales or accounting on the basis of the product that is contained in the transferred carrier. In some cases, the transaction may comprise the sales or accounting for transfer of fresh or spent as well as handling or processing fees associated with fresh or spent (e.g., a fee charged for manufacturing/transporting fresh, or rehabilitating the spent).

"User" is any entity, person, or device capable of receiving at least one of fresh, spent, carrier, product, and product elements. By way of non-limiting example, a user may be a fuel cell, a combustion engine, filling station, industrial process, distribution system, or any other device or system.

"Regeneration" comprises any process that incorporates a carrier with a product or product elements. By way of non-limiting example, where a product is hydrogen, regeneration could be hydrogenation of an unsaturated organic carrier.

Other features and advantages of the present invention will be apparent from the following more detailed description of certain embodiments, taken in conjunction with the accompanying drawings which illustrate, by way of example, the principles of the invention.

DETAILED DESCRIPTION OF THE INVENTION

The instant invention comprises a method of transaction that takes place during fresh/spent exchange. A substantially equal exchange of fresh and spent may occur at the time of the transaction for the sale of the product. The transaction may be defined totally or in part based on product contents in each carrier that is exchanged in the transfer. Product quantity may be measured, calculated, estimated, or defined in any known way. The price charged for the product for sale may comprise at least one of the following: costs for manufacturing product, rehabilitating spent, delivery of spent and fresh, profit, inventory of carrier, loss or makeup of carrier, associated labor such as, for example delivery vehicle driver, among other costs, or any combination of the above. Alternatively, the transaction may be defined based totally or in part on a cost assigned to the fresh and/or spent, which may include handling or processing fees (e.g., a fee charged for rehabilitating the spent). In addition, any portion of the carrier which was not exchanged on equal basis may be taken into account in the exchange transaction and associated financial accounting.

The instant method comprises various aspects. One aspect involves a transaction for the sale of the product, when product is contained in a carrier and/or spent with return of spent back to manufacturing facilities for reprocessing into carrier or fresh.

Another aspect involves providing a system for measuring the quantity of available product in the carrier, whether as fresh or spent. Examples of methods for measurement include utilization of direct or indirect measurements of the carrier such as volume, mass, physical properties, temperature, pressure, among other methods for detecting and measuring. Another method of measurement may be through a differential comparison or calculation involving fresh and/or spent, such as testing or predicting the ability or capacity of spent to accept product, quantifying how much of a product may be loaded into a carrier to form fresh.

Another aspect involves providing means to identify the logistics and/or history of the carrier. This may include a system and methods for collecting and preserving identification and/or other data of: the seller; the buyer; the vessel delivered from; the vessel delivered to; the equipment used to deliver fresh; the equipment used to deliver spent; the equipment used to remove the product; and other information concerning any user or vessel used in the chain of carrier transfer and use. Exemplary systems and methods include RFID tags and RF monitoring equipment, chemical tags and chemical monitoring and/or testing equipment, and other known methods and systems for logistic tracking of chemical substances.

Yet another aspect involves treating the carrier as a capital component of any exchange of the spent and fresh at the time of the transaction. In this aspect, the transaction may include provision for certain loss of the carrier and/or additional carrier to increase capacity, or reduce carrier to decrease capacity. These criteria allow for the transaction of the sale of the product alone.

In general, product, fresh, and spent may be different molecules. That is, hydrogen incorporated into the carrier may form a completely different material or substance from what both were separately. One example of a product and carrier combination may be hydrogen, quinoline, perhydroquinoline, and 1,2,3,4-tetrahydroquinoline. Quinoline (e.g. spent) combined with hydrogen through hydrogenation may form perhydroquinoline (e.g. fresh). Through dehydrogenation to release product, partially dehydrogenated perhydroquinoline may become 1,2,3,4-tetrahydroquinoline (e.g. spent) or fully dehydrogenated quinoline (e.g. spent). Another example of a product and carrier combination may comprise hydrogen, sodium borate, and sodium borohydride. Sodium borate may be processed in a manner that may become sodium borohydride, for example with a process that may or may not include the direct combination of hydrogen gas. Hydrogen may be released from sodium borohydride in a reaction with water and a catalyst. A further example of a product and carrier combination may comprise phosphine and at least one ionic liquid, for example using 1,3-dimethylimidazolium as the cation and $Al_2Cl_7^-$ as the anion. Phosphine may be removed from the ionic liquid (fresh carrier) by applying a pressure differential to the fresh carrier, i.e. a vacuum. Additional examples of suitable ionic liquids are disclosed in U.S. patent application Ser. Nos. 10/948,277 and 11/208,723 entitled "Ionic Liquid Based Mixtures For Gas Storage And Delivery" (hereby incorporated by reference).

The carrier storage capacity may be in the same or different vessel(s) or tank(s) for fresh and spent. For example, two separate storage vessels may be used, where one is used only for fresh and the other one is used only for spent. In another example, one vessel with a stationary separating wall may be used defining two separate compartments of said vessel. Each compartment may be dedicated to either fresh or spent. Yet in another example, one vessel with a divider may be used, wherein a divider may comprise at least one of: i) fixed dividers within the user storage vessel; ii) movable dividers within the user storage vessel; iii) a bladder within the user storage vessel; iv) chemical separation of fresh and spent based upon inherent or modified properties of each; and v) physical separation of fresh and spent based upon inherent or modified physical properties of each.

In one example of the invention, the transaction may also utilize a substantially equal fresh-spent exchange. Substantially equal exchange in this example is defined as equal exchange by volume, mass, ability to accept product, etc. In addition, at least one of the following may be provided during the transaction:
- allow for data collection such as user identification, vehicle identification, vehicle type, payment identification, carrier usable by vehicle, tank capacity, and other relevant data;
- allow for traceability of fraud and/or contamination of the carrier;
- allow for consumer to own, lease or rent the carrier capital;
- allow for independent distributors of the carriers, fresh, spent, and combination of thereof;
- allow the ability to minimize the amount of carrier required for inventory in the system, and;
- allow for credit of any returned product.

In another example of the invention, the transaction comprises a commercial exchange between various commercial entities through the supply chain or may be between the retailer and the end user. In the non-limiting example of a carrier comprising a product, hydrogen, the inventive method comprises transactions between the company that hydrogenates the carrier (or spent) and the company that distributes fresh/spent, the transaction between the distributor and the filling station owner, and the transaction between the filling station owner (retailer) and the user of the automobile that may use the hydrogen. The steps of the inventive method are intended to prevent fraud and provide for the most efficient supply distribution, while accounting for the distributed and collected items to permit an associated monetary transaction.

Figure 1:
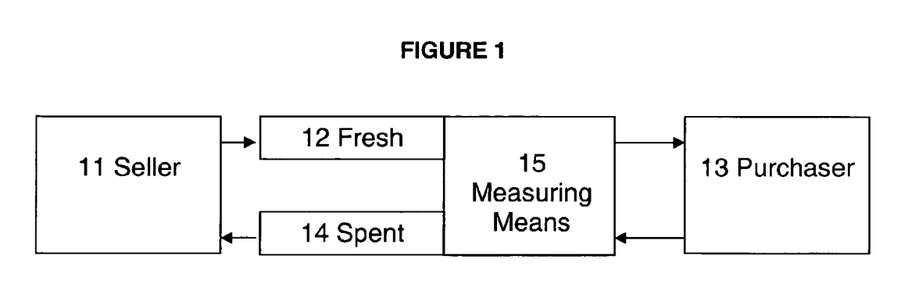
FIG. 1 is a schematic of an exemplary method for conducting a transaction involving exchange of fresh for spent, wherein the transaction is independent of carrier value.

In a further example of the invention, the methods comprise providing a product with no requirement of a separate transaction to account for a carrier value, in other words, a transaction that is essentially independent of carrier value. Such a transaction is illustrated schematically in FIG. 1. Referring now to FIG. 1, in this example seller 11, transfers fresh 12 to a purchaser 13, and purchaser 13 returns spent 14 to seller 11. Normally seller 11 uses measuring means 15 during the returning spent transaction. In this aspect, the term "measuring means" refers to, for example, any data measurement and associated data collection that may include, for example, volume, weight, density, or any other physical or chemical properties and/or may be calculated from data collected including use of known formulas or experimental data. Measuring means 15 may be used to validate that substantially equal quantities exchange of fresh 12 and spent 14. Examples of measuring means may comprise flowmeter, density meter, pressure, temperature gages, optical devices among other means as well as all possible combinations of those measuring means. In this example, the term "substantially equal quantity" may refer to product carrying capacity, volume, mass, and other parameters, as previously defined herein. For example, a seller may be a filling station company and the purchaser may be a vehicle owner, wherein the method involves exchanging substantially equal quantities of fresh into and spent out of the vehicle. In this method, the purchaser pays the filling station for the product, for example hydrogen, incorporated in the carrier.

Examples of transactions that are made on a substantially equal basis based upon product quantity are shown in Table 1, transactions 2-5. Transaction 1 represents an initial fill of fresh carrier into a tank that does not contain any carrier, for example a newly manufactured tank or a tank newly put into service after a repair, or the like. In this example, at the time of the initial fill, the price of fresh is assigned a retail value of $25/kg fresh. The retail price assigned to the contained product hydrogen is $5/kg. These are exemplary retail or wholesale sales prices that would be conveyed to the purchaser at the time of the sales transaction. In transaction 1, the amount of fresh that contains 5 kg of hydrogen is put into the vehicle tank in exchange for $125. The effective value of the carrier is $100 or $125 from the total transaction minus $5/kg hydrogen for 5 kg hydrogen purchased. Before transactions 2 and 3, the vehicle has consumed all of the hydrogen contained in fresh, thus turning the fresh into spent. Transactions 2 and 3 are made on an equal product exchange basis so that 5 kg hydrogen capacity spent is removed from the tank and 5 kg hydrogen capacity fresh is put into the tank. Since roughly equal product carrying quantities of fresh and spent are exchanged, their current economic or monetary value does not directly factor into the transaction. The price for the transaction is $25 or $5/ kg hydrogen for 5 kg hydrogen. Transaction 4 is also on a substantially equal product basis and results in a charge of $10.50 or $5.25/ kg hydrogen for 2 kg hydrogen. In this example, the vehicle owner may have only consumed 2 kg of hydrogen or may only have $10.50 to spend. Spent may remain on the vehicle. Transaction 5 is also on a substantially equal product basis and results in a charge of $25 or $6/kg hydrogen for 4 kg hydrogen. When all transactions are made on a substantially equal product basis as in this example, the carrier quantity in the vehicle retains a consistent product carrying capacity. In this manner, carrier does not need to be directly bought and sold at each transaction. Rather, carrier is purchased at transaction 1, and after that is exchanged only. In this manner it can be treated as an asset and not an expense. The vehicle tank could also have been purchased initially with the carrier already contained in it and incorporated into the purchase price of the vehicle. In that example, transaction 1 would not be required.

TABLE 1 fresh and spent transaction on a substantially equal basis

| Transaction Number | Fresh $/kg H2 | Spent $/kg H2 | Product $/kg H2 | Buy Fresh kg H2 | Sell Spent kg H2 | Equal exch kg H2 | Carrier (excluding product) in Vehicle Tank |
|---|---|---|---|---|---|---|---|
| 1 | 25 | NA | 5 | 5 | | | $100 or $20/kg (5 kg) |
| 2 | NA | NA | 5 | 5 | 5 | 5 | No change 5 kg |
| 3 | NA | NA | 5 | 5 | 5 | 5 | No change 5 kg |
| 4 | NA | NA | 5.25 | 2 | 2 | 2 | No change 5 kg |
| 5 | NA | NA | 6 | 4 | 4 | 4 | No change 5 kg |

In another example of the invention, the transaction further comprises providing a portion of the transaction to be linked through the carrier of the product on a substantially equal basis, and also allows the seller and/or purchaser to exchange more fresh and/or spent than on a substantially equal basis, such as under special circumstances. Examples of special circumstances for not using a substantially equal basis comprise at least one of the following: carrier lost (such as spilled), carrier destroyed (such as by degradation in system and/or by removal of product), increased or decreased storage volume, reduced or increased product need, among other circumstances encountered in the use of a carrier to distribute a product. For example, using the filling station and vehicle owner, the purchaser of a new vehicle may require an initial purchase of fresh with no spent available in the new tank. The first transaction in Table 1 illustrates this initial purchase of fresh. As another example, over time the user (such as a vehicle owner) may notice the substantially equal exchange is, for example, only for 4.9 kg (e.g., because over time some of the carrier, in this example 0.1 kg, has been lost which in turn means that the vehicle owner could continue to refill 4.9 kg only on an equal exchange basis). Optionally, the user may also request to receive additional fresh so the tank on the vehicle is full (i.e. back to 5 kg capacity as shown in Table 1).

The illustrated methods are different than typical prior art sales transactions because known transactions do not provide or account for the return of a carrier as spent, such as for rehabilitation. For example, a conventional prior art sales transaction for gasoline at a filling station to a vehicle owner does not provide for return of spent or any other by-product, let alone one that has a monetary or economic value. Such conventional transactions do not recover spent or any equivalent or analogous substance. The same applies to motor oils, coolants, and other known products that may be exchanged, whether for recycling or for disposal—such products do not incorporate a product as defined herein.

Figure 2:
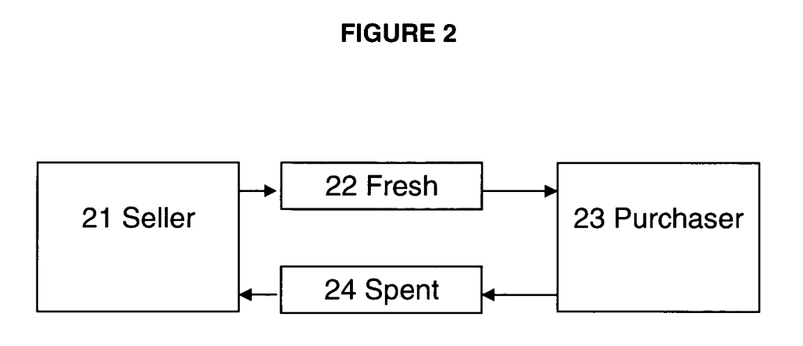
FIG. 2 is a schematic of an exemplary method for conducting a transaction wherein the fresh and spent are treated as independent commodities, such as but not limited to other than a substantially equal exchange basis.

In another example, transactions for fresh and spent may be handled as independent product transfers as shown in FIG. 2. Referring now to FIG. 2, the seller 21 may sell fresh 22 to purchaser 23 and purchaser 23 will sell spent 24 to seller 21. Again, unlike conventional known methods, the inventive method comprises distribution and collection of carrier, whether fresh or spent. In this example, the following accounting and economic aspects are addressed by the invention. First, fresh and spent may be priced independently, so the purchaser may not be able to correlate or equate the price they are paying for product, or how much product they are receiving and/or using. Considering the example of a filling station and a vehicle owner, the vehicle owner needs to not only consider the price of the fresh, as illustrated in Table 2, but also the assigned return value of the spent and the differential of the two as well as the relative quantity of each to carry the product in order to calculate a price and determine which filling station has the best price for the product. The assigned return value may be handled in any of several different ways. Under most circumstances, the carrier returned will be spent, which is different from the purchased carrier as fresh due to one or more different chemical or physical properties or attributes. The transaction for spent may place the purchaser of the fresh in the position of seller of the spent. Examples of problems to be addressed in handling an assigned return value include: the seller of fresh will provide credit in return for spent but not return cash; the transactions for fresh and spent will be completely separate with the seller of fresh becoming the purchaser of spent; the seller of fresh may limit the quantity of spent they are willing to receive; the seller of fresh may refuse to receive spent at all. In this example, the price of product is a variable. In the example wherein fresh and spent incorporate the product as product elements versus simply containing the product, complexities arise in comparing fresh and spent. Exemplary complexities include, but are not limited to, differences in the amount of incorporated product, density, volume, among other determinants, making difficult any calculation of fresh purchased minus spent sold to a user. Table 2 illustrates these points. The prices conveyed to the purchaser in this table are on the basis of mass of the fresh and the basis of mass of the spent carrier, as contrasted with in Table 1 wherein the prices conveyed were on the basis of the contained mass of the product in the carrier. In this example, we utilize hydrogen as the product and further assume a carrier where fresh is 20% product by weight and therefore spent is 80% of the weight density of fresh. In transaction 6, the tank is filled with 25 kg fresh for a cost of $125. In general, it may or may not be conveyed to the purchaser what portion of the fresh price is for the product itself. Transaction 7 is the same as transaction 2 from Table 1 in that all of the spent 20 kg is removed and is replaced by 25 kg of fresh. The method in this example involves two sales transactions, one for the cost of 25 kg of fresh for $125, and the other for the credit of 20 kg of returned or exchanged spent for $100. In this example, it is relatively easy for a consumer to calculate that they paid $25 for their 5 kg contained product tank capacity, which equates to $5/kg for the hydrogen product.

However, in reality, because fresh and spent will have their own separate supply and demand factors, and therefore their own independent monetary or economic value, it is likely that their prices will fluctuate separately. For example, In transaction 8, all of the spent is again sold and the tank is completely refilled with fresh, but the price of spent has dropped, for example because there has been an oversupply of spent on a holiday weekend and the local filling stations have more spent than distribution trailers can haul away. In this example, the total cost to the user has gone up to $45. The price for the hydrogen if based on 20% of the cost of fresh is still $25 of $5/kg hydrogen. But the effective total cost to the user is $9/kg hydrogen since the value of the spent has decreased. In transaction 9, all of the spent in the tank is sold, but only 10 kg fresh is replaced. In this case the spent is returned for $80, but the cost of the fresh is only $50, so the user (here a product purchaser) actually receives a credit of $30. The vehicle tank in this transaction is not completely filled with fresh and the price the user paid for product is no longer immediately apparent. In transaction 10, the prices of both fresh and spent have gone up, some carrier remains in the vehicle tank after the spent is removed, and fresh is added but not in sufficient amount to fill the tank to its maximum capacity. At this point it is no longer clear to the purchaser how much product is present in their vehicle tank let alone what the price of the purchased product will be.

Another problem is that the purchaser may not be able to easily detect whether they are losing overall carrying capacity over time due to any of the various reasons previously described herein, for example poor system operation or loss or theft of carrier, fresh, or spent. By way of further example, fresh and spent having substantially equal product carrying capability may have different volume, mass or density, so the purchaser only knows the quantity of carrier they purchase and return and the price they pay for it. Additionally, it is possible that, for example, an individual may attempt to "game" the system. For example, they could sell spent and purchase fresh at different locations and times for financial advantage based on the price differential of fresh and spent. In another example, one could sell spent to obtain cash that will require repurchase in order for the vehicle to regain full fuel carrying capacity. In these examples, it is likely to have detrimental impact on the distribution of carrier because of the imbalance between fresh and spent quantities.

In another example of the invention, the transaction further comprises conveying the product carrying capacity of the carrier as a basis for the transaction. Table 3 illustrates the same transaction quantities as shown in Table 2, but conveyed on the basis of the product carrying capacity instead of the carrier capacity. In this example both the price of the fresh and spent as well as the quantity of the fresh and spent transferred are identified on the basis of the hydrogen product they are capable of containing. In transaction 11, it is obvious to the purchaser that the fresh being purchased matches the 5 kg hydrogen capacity of the vehicle, without having to know and understand the physical characteristics of the specific fresh they are purchasing. In transactions 12 and 13, it is obvious to the purchaser that they are retaining the full 5 kg hydrogen carrying capacity of the vehicle, as contrasted with the same transactions 7 and 8 of Table 2, where it wasn't obvious since they were removing 20 kg of spent and adding 25 kg of fresh. In transaction 14, wherein more spent is removed than is replaced with fresh, the purchaser can more easily comprehend that their tank is 40% full of fuel since they removed all of their spent 5 kg carrying of hydrogen and replaced with fresh at only 2 kg carrying capacity giving them 40% "full" tank. In Transaction 15, the calculation gets more challenging as the purchaser needs to know they currently have 2 kg carrying capacity, they are adding 4 kg with new fresh for 6 kg total and they are removing 1.25 for total at the completion of the transaction of 4.75 kg hydrogen carrying capacity, or close to a "full" tank. However, by the time a user reaches transaction 10 in Table 2, which represents the same transaction on a carrier mass basis, it is not reasonable to expect the purchaser to have an understanding of the product available in their vehicle.

In another example of the invention, the transaction further comprises conveying the product carrying capacity of the carrier and treating fresh and spent transfer on a substantially equal basis to the extent possible on any transaction without limiting exception for special circumstances. While the exemplary methods providing for an exchange on a substantially equal basis is desirable, for example, to prevent potential theft or fraud of the carrier, such methods are not always possible for all circumstances. A method that freely allows the seller and purchaser to transact for quantities on other than a substantially equal exchange basis may be desirable in some instances. For example, there may be circumstances where the carrier has an independent use outside of the product distribution systems addressed by this invention, or wherein the spent cannot be rehabilitated, or wherein the carrier can be used as a product itself, thereby limiting the desirability and/or potential for rehabilitation. To address these circumstances, there is nonetheless a benefit to providing for a portion of the transaction to be linked through the carrier by the product on a substantially equal basis as illustrated in the example in Table 4.

Table 4 illustrates an example where substantially equal basis transactions are utilized on the same transactions as illustrated in Tables 2 and 3. In this example, since all or part of a filling transaction may take place on a substantially equal basis, there is the potential for the product to be treated as a separate and independent commodity. Therefore, the prices conveyed to the purchaser are for fresh and spent, both are typically on their product containing capacity as well as the product-based price for any amount of carrier exchanged equally. Transaction 16 is identical to Transaction 11 in Table 3 since it represents strictly a purchase of fresh. Transactions 17 and 18 are both completed strictly on a substantially equal basis since the same product carrying capacity of fresh and spent are transferred. In this case, the price to the purchaser is the same for both transactions $5/kg for 5 kg product carrying capacity exchanged. In transaction 18, the price of spent has fluctuated but the price of product sold on an equal exchange basis has remained constant independently. In transaction 19, only 2 kg product containing capacity are equally exchanged and 3 additional kg are removed as spent. The cost of the transaction is 2 times $5.25/kg for the equal exchange portion and a credit of $48 or 3 kgs at $16/ kg for the returned spent for a total transaction credit of $37.50. In transaction 20, 1.25 kg are exchanged on an equal basis and 2.75 additional kgs are purchased fresh for a total transaction cost of $90.

In a non-substantially equal basis exchange example, the purchaser may pay additional money for the carrier over the lifetime of its use when the carrier is not transferred on a substantially equal basis. For example, when fresh and spent are accounted for as separate independent transactions as illustrated in Tables 2 and 3, the purchaser may be left to the mercy of the fluctuating value of the carrier even if they retain the full carrying capacity of carrier for the entire lifetime of the vehicle. The effective initial price of the carrier in Tables 1-4 was $100 ($125 for fresh less $25 for the initial charge of product). The total cost of all of the transactions in Table 1 is $209.50. At the end of transaction 5, the effective cost of carrier in the tank is still $100 since none was exchanged independently so $109.50 was spent on the product hydrogen. Table 4 differs from Table 1 in that the purchaser was not restricted to transferring carrier on a substantially equal basis, but the prices and quantities transferred are the same otherwise. The total cost of all of the transactions in Table 4 is $227.50. At the end of transaction 20, the effective cost of carrier in the tank is potentially different than the initial $100 since some fresh and spent were exchanged partially independently. Since the price for hydrogen would have been $109.50 if all transactions were on a substantially equal basis, the effect cost of the carrier in the vehicle tank is now $118. The total cost of all of the transactions in Table 3 is $260. At the end of transaction 15, the effective cost of carrier in the tank is potentially different than the initial $100 since all fresh and spent were exchanged completely independently. Since the price for hydrogen would have been $109.50 if all transactions were on a substantially equal basis, the effect cost of the carrier in the vehicle tank is now $150.50. In the example of a vehicle where there may be hundreds of transfers over time, the ultimate cost to the purchaser of carrier may become quite significant. Thus, as noted in our exemplary methods above, transactions utilizing a substantially equal basis exchange of fresh and spent is effective. This is because, among other things, the fact that new carrier may be more expensive does not affect the transaction between the seller and purchaser and thus the carrier may be considered, for example, a capital component of the vehicle.

TABLE 2 fresh and spent exchanged independently
with no identified product price

| Transaction Number | Fresh $/kg | Spent $/kg | Product $/kg H2 | Buy Fresh kg | Sell Spent kg | Transaction Cost to Purchaser |
|---|---|---|---|---|---|---|
| 6 | 5 | NA | NA | 25 | | $125 |
| 7 | 5 | 5 | NA | 25 | 20 | $25 |
| 8 | 5 | 4 | NA | 25 | 20 | $45 |
| 9 | 5 | 4 | NA | 10 | 20 | ($30) |
| 10 | 6 | 5 | NA | 20 | 5 | $95 |

TABLE 3 fresh and spent exchanged independently, but
sold on an equivalent product price basis

| Transaction Number | Fresh $/kg H2 | Spent $/kg H2 | Product $/kg H2 | Buy Fresh kg H2 | Sell Spent kg H2 | Transaction Cost to Purchaser |
|---|---|---|---|---|---|---|
| 11 | 25 | NA | NA | 5 | | $125 |
| 12 | 25 | 20 | NA | 5 | 5 | $25 |
| 13 | 25 | 16 | NA | 5 | 5 | $45 |
| 14 | 25 | 16 | NA | 2 | 5 | ($30) |
| 15 | 30 | 20 | NA | 4 | 1.25 | $95 |

TABLE 4 fresh and spent linked in exchange by product price
and sold on an equivalent product price basis

| Transaction Number | Fresh $/kg H2 | Spent $/kg H2 | Product $/kg H2 | Buy Fresh kg H2 | Sell Spent kg H2 | Equal exch Kg H2 | Transaction Cost to Purchaser |
|---|---|---|---|---|---|---|---|
| 16 | 25 | | 5 | 5 | | | $125 |
| 17 | 25 | 20 | 5 | 5 | 5 | 5 | $25 |
| 18 | 25 | 16 | 5 | 5 | 5 | 5 | $25 |
| 19 | 25 | 16 | 5.25 | 2 | 5 | 2 | ($37.50) |
| 20 | 30 | 20 | 6 | 4 | 1.25 | 1.25 | $90 |

Figure 3:
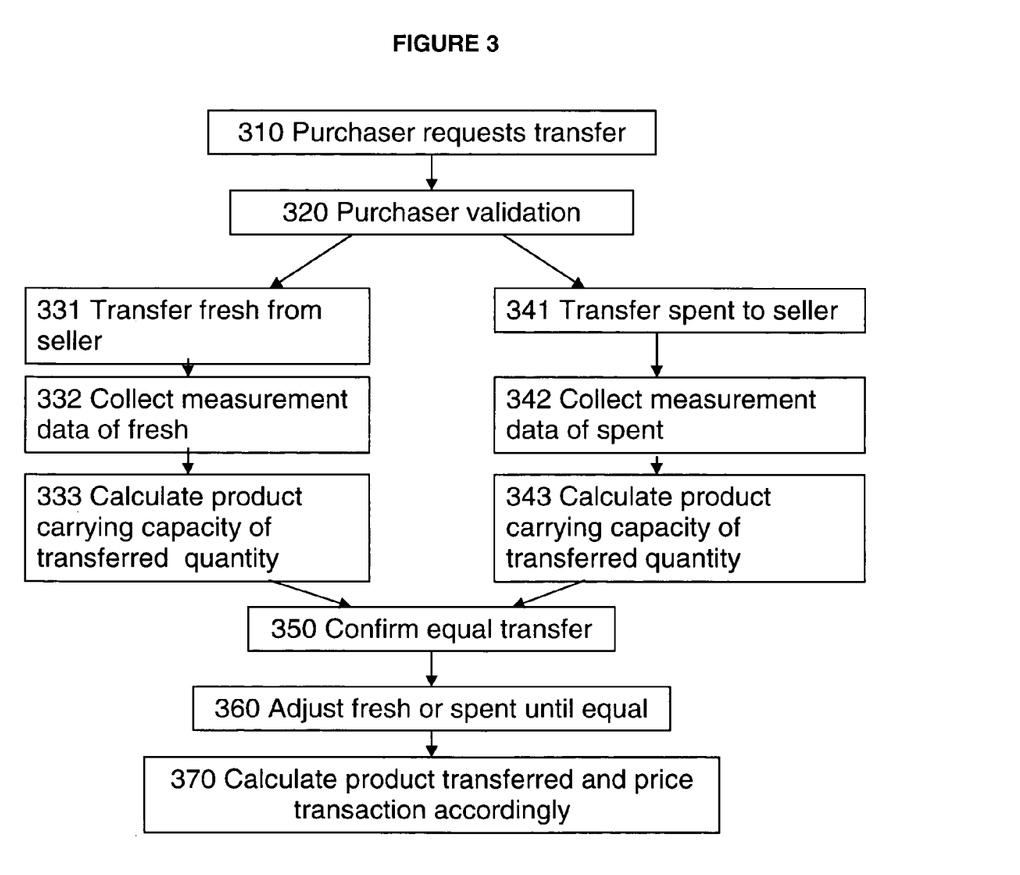
FIG. 3 is a schematic of an exemplary method for conducting a transaction exchanging fresh and spent on a substantially equal basis, wherein the method includes measuring and calculating the product carrying capacity of the spent and fresh.

Referring now to FIG. 3, FIG. 3 illustrates another example of the invention applicable to any transaction or portion of a transaction that is done on a substantially equal basis. For example, in step 310, a purchaser may request a transaction involving the transfer of fresh and return of spent to acquire product for a user device such as a vehicle. There are many different methods that can be used for determining the amount of fresh and product to be transferred, and the amount of spent to be returned. Nonlimiting examples and factors comprise: product quantity requested; available storage volume for fresh; available storage volume for spent; storage volume required for a combination of fresh/spent; total price purchaser is willing to pay; volume of spent to be removed; amount of product capacity remaining, and other parameters. Optionally, in step 320, the seller may wish to validate the purchaser for such reasons as, for example: having the correct type of spent; having a system that can correctly remove product from fresh; ability to pay for the transaction; and vehicle compatibility with available fresh and/or product type, among other transaction related determinations. Once validated, the transaction can proceed. In this example, the method involves transfer of fresh in step 331, as well transfer of spent in step 341. Either step 331 or 332 may be performed independently of the other, whether done in series, alternately, or simultaneously, in part or entirety. In steps 332 and 342, the respective measurements of fresh and spent are taken, and measurement data is collected to facilitate the associated financial transaction. Measurement and data collection can be performed using any known systems and methods. Where the quantity of the product in the fresh or spent is not, or cannot be, made by a direct measurement, it may also be desirable to calculate the net amount of product transferred. For example, it may be desirable to calculate the product carrying capacity of transferred fresh as in step 333, and to calculate the product carrying capacity of transferred spent as in step 343. These calculated amounts may then be compared in step 350 to determine whether the transfer has been performed on a substantially equal basis, taking into consideration the desired method for the particular transfer as previously discussed herein. Where desirable, the method may further comprise the step 360 of effecting a further transfer of fresh and/or spent until the exchange meets the criteria of a substantially equal exchange. Once the transfer is completed, the method provides the step 370 of calculating the amount of product transferred, and assigning a price to the transaction for payment by, or credit to, the purchaser.

In order to monitor the transfer and/or exchange of spent and fresh, the system and methods utilize at least one device as means to measure at least one chemical or physical property of the spent or fresh. The measured property can be correlated to product content in the carrier. For example, product content may be determined by measuring fresh or spent density and comparing the results to those defined in a pre-established density curve. In general, each carrier may have its own pre-established quality control curves. In another example, product content may be monitored in order to communicate to the user the quantity/quality of product in the carriers that are being loaded/offloaded. Density measurements conducted with a carrier comprising hydrogenated Quinoline show that density may vary by as much as 10%, increasing when the contained hydrogen level is decreasing. For example, density of spent comprising Quinoline was measured at 1.093 g/cc. When Quinoline is fully hydrogenated, it (as a carrier) becomes fresh comprising Perhydroquinoline with measured density of 0.933 g/cc and carrier that is only partially spent becomes, for example, 1,2,3,4-Tetrahydroquinoline with measured density of 1.061 g/cc. Other methods may be used, such as but not limited to, for example, UV and IR sensors or refractive index based measurements as was mentioned above. The ability to measure product content can be useful since a carrier may deteriorate with time and may gradually lose product carrying capacity. Similar device may be installed at a user as an onboard device and may be used as, for example, a product content monitoring gauge. A product content monitoring device may be based on measurements of, for example, physical, chemical, electrical, optical, or any other properties of the carrier with or without product contained. In addition, the device may be constructed utilizing differential or absolute measurement techniques. For example, measuring density of the carrier with product once per established unit time, for example, every five minutes and comparing it to a standard pre-established density data for a given carrier may provide the user with information on amount of product left in the carrier or on how well product is removed by a product removal device, for example dehydrogenation unit. Different computing or display systems may be employed to integrate obtained information into a format convenient for a specific user.

In another example of the transaction illustrated in FIG. 3, the inventive method involves using the filling station and vehicle owner, wherein the vehicle owner takes the vehicle to a filling station for refilling and in step 310 requests removing substantially all of spent from the tank and replacing it with fresh. In step 320, the seller may perform a validation check, such as checking the vehicle identification to confirm correct carrier usage and validating the driver's credit card before proceeding to permit the exchange. The spent may be removed from the tank first in step 341, for example to allow space for fresh to be delivered if both share the same tank, and fresh exchange in step 331 may begin before the spent removal is completed. Measurement of fresh in step 332 and spent in step 342 will continue to occur with appropriate calculations in steps 333 and 343 until the spent is substantially removed. At that point a calculation is made to determine the quantity of fresh that is required for a substantially equal basis exchange in step 350, and the fresh transfer continues until it is equal in step 360. When completed, the seller calculates the amount of product transferred and charges the vehicle owner accordingly in step 370. The measurements and calculations in the various steps may be completed independently with dedicated equipment or may be combined as practical. A filling dispenser with its associated equipment is a likely example of a piece of equipment that might be utilized for controlling the various steps in the total transaction including the financial transaction.

In some cases, fresh may not have a constant relationship to product. The measurement data of fresh in step 332 and the calculation of step 333 may be used knowing information about their relationship. For example, the temperature at the time of transfer may affect the quantity of product incorporated in the carrier. The final calculation of the transfer may allow for price adjustments in step 370, for example if the fresh does not meet standard specifications for incorporated product.

In other cases, spent may have inconsistent properties that may be adjusted for in the transaction. For example, spent may have some quantity of carrier that has degraded that may be measurable by data collected on spent in step 342 and may use a calculation in step 343 based on known information of degradation of the carrier. The final calculation of the transfer may allow for price adjustments in step 370, for example so the seller does not overpay for lesser quality spent that may require additional processing.

In another case, spent may be returned to the Seller contaminated. For example spent may be of a quality that is not capable of being regenerated because of the introduction of a contaminating foreign substance, or may require additional spent decontaminating steps. The final calculation of the transfer may allow for price adjustments in step 370 for example so the seller does not credit the purchaser for non-acceptable spent and also receives potential compensation from the purchaser for managing the processing, contamination of other carrier, and/or disposal.

In another example of the inventive method, the transaction involves spent may be distinct for each purchaser returning spent in exchange for fresh, for example, because the carrier has different amounts of incorporated product remaining therein. This could happen, for example, if different vehicles are operated differently so that the amount of product removed from the carrier varies. For example, in the case of dehydrogenation of hydrogen from a carrier, the temperature of the waste heat in the vehicle may be higher in one car than another thus 99% of the usable product in the carrier may be converted in one vehicle and only 95% in the other. As in the previous example, the final calculation of the transfer may allow for price adjustments in step 370 for example based on retained product.

In another example, the transaction comprises calculating the total incorporated product, whether or not it is usable. In this example, the final transfer may be based on total amount of product delivered instead of the amount of product used.

In a further example, fresh or spent may be transferred between the seller and purchaser with the use of a container or package, for example a cylinder, bulk liquid tank, a carton box, among other means for housing the carrier. If desired, the transaction may be completed by exchanging or swapping, for example, one package that may contain spent with another package that may contain fresh. In the case of returning spent, it may not be acceptable to receive tainted or contaminated spent with any other substance that may have the possibility to render the carrier worthless. However, it may be acceptable, for example, to have carrier returned as fresh. In this particular case, due to its incorporation of product, that fresh may have a higher potential value as compared to spent having little or no product incorporated therein, so that the fresh may be assigned a higher monetary credit in the sales transaction.

If desired, completing the transaction can be delayed wherein a package or container is utilized to contain fresh and/or spent. In such an example where a purchaser may have only one container that may need to be in continuous use, the purchaser may not be able to exchange the package at the time a fresh package is delivered. An example of such a delay in this transaction may be handled by, for example, an inventory holding charge with a provision that the purchaser may become responsible for the cost of the carrier and may be billed for it if the return of said carrier has not occurred within, for example, 30 days.

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for dispensing a product to a user, the method comprising the steps of:
    providing fresh, fresh being a carrier releasably incorporating a product;
    separating product from the fresh thereby converting the fresh into spent;
    providing a first user, the first user comprising:
        at least one storage vessel adapted for receiving and storing fresh; and
        at least one storage vessel adapted for receiving and storing spent collected from the first user;
    separating product from the fresh,
    collecting spent from the at least one storage vessel;
    providing and using a system for measuring the quantity of product in the spent,
    providing and using a system for measuring the presence of at least one chemical or physical property of the collected spent;
    comparing the at least one detected chemical or physical property of the collected spent with at least one predetermined criteria in order to determine whether the spent is contaminated;
    collecting uncontaminated spent and,
    regenerating uncontaminated collected spent by incorporating product into the uncontaminated collected spent.

2. The method of claim 1, further comprising the additional step of dispensing fresh to at least one storage vessel of the first user.

3. The method of claim 2, wherein the step of dispensing fresh and the step of collecting spent are controlled so as to operate substantially simultaneously.

4. The method of claim 1, further comprising the additional step of collecting user identification information.

5. The method of claim 4, further comprising the additional step of associating user identification information with the collected spent and conducting at least one of: identification of the first user as the source of the spent; historical review of the first user's fresh and/or spent transactions; user type; user carrier type; user vehicle type; and user storage capacity.

6. The method of claim 1, wherein the system for measuring comprises at least one member selected from the group consisting of: viscosimeters, conductivity measuring devices, density measuring devices, chemical analyzers, gas analyzers, gas chromatographs, liquid chromatographs, ultraviolet detectors, infrared detectors, optical sensors, and combinations thereof.

7. The method of claim 1, wherein the product comprises at least one member selected from the group consisting of hydrogen, fluorine, chlorine, oxygen, arsine, stibine, phosgine, methane, hydrogen fluoride, natural gas, methanol, and combinations thereof.

8. The method of claim 1, wherein the product comprises hydrogen, wherein the carrier comprises at least one organic chemical, wherein fresh comprises at least one hydrogenated derivative of the organic chemical, and wherein spent comprises at least one at least partially dehydrogenated derivative of the fresh.

9. The method of claim 1, wherein the carrier comprises at least one member selected from the group consisting of: organic chemicals, ionic liquids, and chemical hydrides.

10. The method of claim 1 further comprising returning contaminated spent to the user.

11. The method of claim 1 further comprising collecting contaminated spent and disposing of the contaminated spent.

12. The method of claim 1 wherein the incorporating product into the uncontaminated collected spent comprises hydrogenating the uncontaminated collected spent.

13. The method of claim 1 wherein the product comprises hydrogen.

14. The method of claim 1, further comprising the additional step of assigning a monetary value to the collected spent based upon the step of comparing the at least one measured chemical or physical property to the at least one predetermined criteria.

15. The method of claim 1, wherein said regenerating comprises hydrogenating an uncontaminated spent.

16. A method for dispensing a product to a user, the method comprising the steps of:
    providing fresh, fresh being a carrier releasably incorporating a product, fresh further becoming spent upon release of product from fresh;
    providing a first user, the first user comprising:
        at least one storage vessel adapted for receiving and storing fresh; and
        at least one storage vessel adapted for receiving and storing spent collected from the first user;
    collecting spent from the at least one storage vessel;
    using at least one system for detecting at least one chemical or physical property of the collected spent;
    comparing the at least one detected chemical or physical property of the collected spent with at least one predetermined criteria thereby determining whether the collected spent is contaminated;
    collecting contaiminated spent;
    collecting uncontaminated spent;
    determining an estimated amount of product to be transferred to the first user;
    collecting and validating information concerning the user;
    transferring fresh to at least one storage vessel of the first user;
    collecting measurement data concerning fresh transferred to the first user;
    transferring spent from at least one storage vessel of the first user;
    collecting measurement data concerning spent transferred from the first user;
    calculating the net amount of product transferred; and
    using at least one measuring means for determining whether the transfer of fresh and transfer of spent has been performed on a substantially equal exchange basis.

17. The method of claim 16, further comprising the additional step of adjusting at least one of the amount of fresh transferred or the amount of spent transferred to effect an exchange on a substantially equal basis.

18. The method of claim 16, further comprising the additional step of determining that special circumstances exist if the transfer of fresh and transfer of spent has been performed on other than a substantially equal basis.

19. The method of claim 16 further comprising regenerating uncontaminated collected spent by hydrogenating the uncontaminated collected spent.

20. The method of claim 19 further comprising rehabilitating or disposing of contaminated collected spent.

21. The method of claim 20 comprising disposing of contaminated collected spent.

22. The method of Clam 16 further comprising returning contaiminated collected spent to the user.

23. The method of claim 16 wherein the product comprises hydrogen.

* * * * *